US007008677B2

(12) United States Patent
Hodson et al.

(10) Patent No.: US 7,008,677 B2
(45) Date of Patent: Mar. 7, 2006

(54) FILM STRUCTURES AND PACKAGES THEREFROM USEFUL FOR PACKAGING RESPIRING FOOD PRODUCTS

(75) Inventors: Jay D. Hodson, Greenville, WI (US); Chad M. Perre, Neenah, WI (US)

(73) Assignee: Pechiney Emballage Flexible Europe, (FR)

( * ) Notice: Subject to any disclaimer, the term of this patent is extended or adjusted under 35 U.S.C. 154(b) by 5 days.

(21) Appl. No.: 10/668,427

(22) Filed: Sep. 23, 2003

(65) Prior Publication Data

US 2005/0064119 A1 Mar. 24, 2005

(51) Int. Cl.

*B29D 22/00* (2006.01)
*B29D 23/00* (2006.01)
*B32B 1/08* (2006.01)

(52) U.S. Cl. .................. 428/35.7; 428/349; 428/475.5

(58) Field of Classification Search ............... 428/35.7, 428/349, 423.5, 424.8, 474.4, 475.5, 475.8
See application file for complete search history.

(56) References Cited

U.S. PATENT DOCUMENTS

| | | | | |
|---|---|---|---|---|
| 4,291,092 | A | 9/1981 | Weiner | |
| 4,421,823 | A | 12/1983 | Theisen et al. | |
| 5,382,470 | A | 1/1995 | Vicik | |
| 6,224,956 | B1 | 5/2001 | Shah | |
| 6,316,067 | B1 | 11/2001 | Edwards et al. | |
| 6,511,688 | B1 | 1/2003 | Edwards et al. | |
| 2002/0034622 | A1 * | 3/2002 | Edwards et al. ............ | 428/220 |

OTHER PUBLICATIONS

International Search Report for International Application No. PCT/US04/31144. (3 pp.).

* cited by examiner

*Primary Examiner*—Michael C. Miggins
(74) *Attorney, Agent, or Firm*—McDermott Will & Emery LLP

(57) ABSTRACT

A multilayer laminate useful in the packaging of respiring food products such as swiss-type cheeses which generate or release carbon dioxide gas during storage and wherein said multilayer laminate allows for the egress of said gas while minimizing the ingress of oxygen. The multilayer laminate comprises at least one layer of a low gauge polyamide such as poly (ε -caprolactam).

19 Claims, 1 Drawing Sheet

FILM STRUCTURES AND PACKAGES THEREFROM USEFUL FOR PACKAGING RESPIRING FOOD PRODUCTS

FIELD OF THE INVENTION

The invention relates to multilayer laminates useful in the packaging of respiring food products such as swiss-type cheeses. More specifically, the invention relates to multilayer laminates and packages made, therefrom, having high carbon dioxide ($CO_2$) permeability rates while maintaining low oxygen ($O_2$) permeability rates.

BACKGROUND OF THE INVENTION

Polymeric film structures and packages made therefrom are useful in the packaging field for the packaging of food products, especially respiring food products such as natural cheeses. These film structures and the packages made therefrom generally contain multiple layers of polymers in which each layer adds certain physical or chemical properties to the completed film or package made therefrom.

In the packaging of respiring food products such as natural cheese (i.e., swiss-type cheese) certain packaging problems exist. These packaging problems exist due to process by which the respiring product is made and because of the packaging requirements of the final product. For example swiss-type cheeses are made utilizing specific molds or bacteria to produce the "eyes" which are characteristic of this type of cheese. Specifically, swiss-type cheeses are ripened by typically adding bacteria such as Propionibacter Shermanii to form the "eyes" of the cheese. These "eyes" are formed as gas pockets of $CO_2$ which is given off by the swiss-type cheese. This $CO_2$ elimination not only occurs during production of cheese but continuing during the "life" of the product including the packaged product. Too much $CO_2$ inside the package causes the "package to "pillow." "Pillowed" packages are negatively received by the consumer. Also, natural food products such as swiss-type cheeses are affected by atmospheric oxygen ($O_2$) during the transporting and storing of this type of product in a package. If the permeability of $O_2$ is too rapid, the product "life" is shorter. Shorter product life affects the financial aspects of the product. Therefore, these inherent problems which are associated with respiring food products such as swiss-type cheeses must be addressed by utilizing film structures and packages made therefrom which will deal with these problems in an efficient manner. In addition to addressing the above problems, the film structures and packages must also provide stiffness, moisture barrier and maximize flex crack resistance. Also, the film structures and packages must be cost-effective."

DESCRIPTION OF THE PRIOR ART

Various documents disclose different approaches to addressing the aforementioned problems which are associated with the packaging of respiring food products such as swiss-type cheeses U.S. Pat. No. 6,316,067 to Edwards et al. disclose a multilayer cheese packaging film and packages made therefrom having high $CO_2$ permeability and low $O_2$ permeability. These permeability rates are achieved by having at least one layer preferably the core layer of the film structure comprising a blend of nylon 6/66 copolymer and ethylene vinyl alcohol copolymer.

SUMMARY OF THE INVENTION

It is an object of the present invention to provide a film structure having a high carbon dioxide permeability rate while maintaining a low oxygen permeability rate.

It is another object of the present invention to provide a film structure having good stiffness and moisture barrier.

It is still another object of the present invention to provide a film structure having at least four layers.

It is a further object of the present invention to provide a film structure having a high carbon dioxide ($CO_2$) permeable outer layer.

It is a further object of the present invention to provide a film structure having a low oxygen ($O_2$) permeable outer layer.

It is a further object of the present invention to provide a film structure which can be made into packages for the transporting and storing of respiring food products especially swiss-type cheeses wherein said packages have reduced pillowing during use and longer shelf life.

It is a still further object of the present invention to provide a film structure having a thin outer layer which allows for the egress of carbon dioxide but retards the ingress of atmospheric oxygen.

The foregoing objects are attained by providing a film structure comprising at least four layers and wherein said film structure has a high carbon dioxide permeability rate and a low oxygen permeability rate. The film structure can then be used to form packages for the transporting and storing of respiring food products. Other objects, advantages and features of the present invention will become apparent from the following detailed description, which, when taken in conjunction with the annexed drawings discloses preferred embodiments of the present invention.

DEFINITIONS

As used herein, the term "extrusion coating" is process of coating resin on to a substrate (paper, fabric, film, foil) by extruding a thin film or web, of molten resin directly on to the substrate without the use of adhesive.

As used herein, the term "extrusion lamination" is a process of bonding together two or more substrates such as polymeric film, by means of a molten polymer as the adhesive.

As used here, the term "carbon dioxide ($CO_2$) permeability rate" is defined as the volume of gas ($CO_2$) in $cm^3$ which passes through a 100 square inches of film in a twenty-four hour period at room temperature and 1 atmosphere of pressure.

As used herein, the term "oxygen ($O_2$) permeability rate" is defined as the volume of gas which passes through a 100 square inches of film in a twenty-four hour period at room temperature and 1 atmosphere of pressure.

As used herein, the term "gauge" refers to the thickness of a film, 100 gauge=1 mil; 48 gauge film=0.00048 in.

As used herein, the term "polyethylene" refers to an ethylene homopolymer and/or copolymer of a high percentage of ethylene with one or more alpha olefins.

As used herein, the term "ethylene vinyl acetate copolymer" refers to a copolymer formed from ethylene and vinyl acetate monomers wherein the ethylene monomer portion is present in a higher percentage by weight than the vinyl acetate monomer portion of the ethylene vinyl acetate copolymer.

As used herein, the term "high $CO_2$ permeability" refers to a $CO_2$ permeability rate from about 10 $cm^3$ to about 20 $cm^3$ per 100 $in^2$/24 hrs. at room temperature and 1 atmosphere.

As used herein, the term "respiring food product" is defined as a food product which gives off a gas such as carbon dioxide ($CO_2$).

As used herein, the phrase "sealant layer", with respect to multilayer films, refers to that layer which is in direct contact with the product.

As used herein the term "swiss-type cheese or cheeses" are defined as a cheese having "eyes" which are formed by $CO_2$.

DETAILED DESCRIPTION OF THE INVENTION

Figure 1:
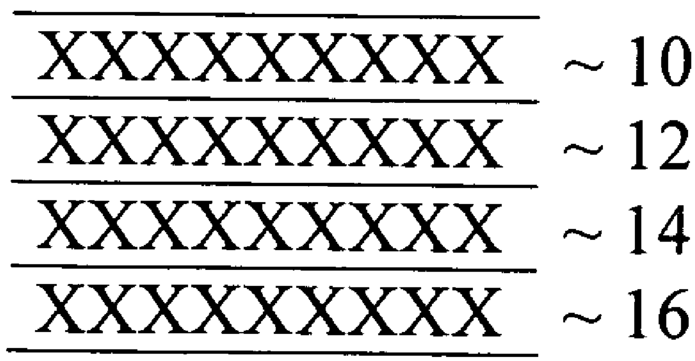
FIG. 1 depicts a four layer film structure of the present invention.

The film structures of the present invention may be used as high carbon dioxide permeable and low oxygen permeable films for the curing, transporting and storing of respiring food products such as swiss-type cheeses.

The film structures of the present invention can be formed into packages for the curing, transporting and storing of respiring food products. These packages are made by technology known to those skilled in the art. The particular shape, size and structure of the packages which can be made from the film structures of the present invention will be governed by the type and size of the specific respiring product and the particular problems to be overcome in its packaging.

The present invention is particularly useful in the packaging of swiss-type cheeses. As was discussed above, this type of cheese produces "eyeholes" during processing. These "eyeholes" are produced by pockets of carbon dioxide which are generated by the $CO_2$ producing bacteria such as Propionibacter Shermanii. While the present invention has been described for use in the packaging of swiss-type cheeses the present invention can also be employed for the packaging of a number of other cheeses which are exemplified by but not limited to Emmental, Jarlsberg, Gruyere and Herregaardsost. It is also envisioned that the film structures of the present invention and packages made therefrom would also be useful in the transporting and storing of other food products such as coffee and produce.

Embodiments of the present invention have a $CO_2$ permeability rate of from about 10 $cm^3$ per 100 $in^2$/24 hrs to about 20 $cm^3$ per 100 $in^2$/24 hrs at room temperature (73° F.) and 1 atmosphere (ambient atmosphere 101325 Pa). A preferred $CO_2$ permeability rate is from about 13 $cm^3$ per 100 $in^2$/24 hrs at room temperature and 1 atmosphere to about 16 $cm^3$ per 100 $in^2$/24 hrs at room temperature and 1 atmosphere.

Embodiments of the present invention have an oxygen ($O_2$) permeability rate of from about 2.5 $cm^3$ per 100 $in^2$/24 hr at room temperature and 1 atmosphere to about 5 $cm^3$ per 100 $in^2$/24 hr at room temperature and 1 atmosphere. A preferred $O_2$ permeability rate is from about 3 $cm^3$ per 100 $in^2$/24 hr at room temperature and 1 atmosphere to about 4 $cm^3$ per 100 $in^2$/24 hr at room temperature and 1 atmosphere.

The desirable high $CO_2$ permeability rate and low $O_2$ permeability rate are achieved by using a packaging film structure wherein at least one layer preferably the outer layer of said packaging film structure comprises a polyamide having a thickness from about 40 gauge to about 80 gauge. A ratio of $CO_2$ permeability rate to $O_2$ permeability rate for film structures of the present invention is an $CO_2$ permeability rate from about 10 to 20 $cm^3$ per 100 $in^2$/24 hr at room temperature and 1 atmosphere and an $O_2$ permeability rate of from about 2.5 $cm^3$ to about 5 $cm^3$ per 100 $in^2$/24 hr at room temperature and 1 atmosphere.

A preferred ratio of $CO_2$ permeability to $O_2$ permeability for film structures of the present invention is an $CO_2$ permeability from about 13 $cm^3$ per 100 $in^2$/24 hr at room temperature and 1 atmosphere and an $O_2$ permeability of from about 3 to 4 $cm^3$ per 100 $in^2$/24 hr at room temperature and 1 atmosphere. This ratio can be achieved using an 60 gauge polyamide, preferably poly ($\epsilon$-caprolactam) in the outer layer of the film structure.

Another preferred ratio of $CO_2$ permeability to $O_2$ permeability for film structures of the present invention is an $CO_2$ permeability of from about 16 $cm^3$ per 100 $in^2$/24 hr at room temperature and 1 atmosphere and an $O_2$ permeability of from about 4 to 5 $cm^3$ per 100 $in^2$/24 hr at room temperature and 1 atmosphere. This ratio can be achieved using an 48 gauge polyamide, preferably poly ($\epsilon$-caprolactam) in the outer layer of the film structure.

The above preferred embodiments of the present invention provided a packaging film structure having high $CO_2$ permeability rates while maintaining a low $O_2$ permeability rate. These preferred embodiments provide a packaging film structure wherein the packages which are formed from the film structures have reduced pillowing and longer shelf life, close to 6 months.

The polyamide layer of the film structure may have a thickness of from about 40 to about 80 gauge with about 48 to about 60 gauge being preferred.

While it is preferred that the outer layer consist essentially of a polyamide to obtain the desirable high $CO_2$ permeability rate and the low $O_2$ permeability rate, it is also recognized that this layer may be comprised of a blend of different polyamides in various amounts. It is also recognized that this layer may comprise, in addition to the polyamide or polyamide blend, other additives including processing aids.

In a particularly preferred embodiment of the present invention the film structure is a four layer structure. The total film structure may have a thickness from about 2.5 to about 3.5 mils, and preferably has a thickness from about 3.0 to about 3.2 mils.

The first layer is the outer layer of the film structure. The outer layer comprises a polyamide or a polyamide blend wherein the polyamide is independently selected from the groups consisting of poly (hexamethylene sebacimide) [nylon 6,10], poly (hexamethylene adipamide [nylon 6,6] and poly ($\epsilon$-caprolactam) [nylon 6]. A preferred polyamide is poly ($\epsilon$-caprolactan). The polyamides useful in the practice of this invention will have a layer thickness of about 40 to about 80 gauge, with a thickness of about 48 to about 60 gauge being preferred. A suitable polyamide for practice in this layer is supplied by Honeywell or American Biaxis.

This first outer layer of the film structure will comprise the exterior surface of the resultant package. As the exterior layer of the film structure, it should be resistant to abuse, and abrasions. Also as the exterior layer of the film structure it will regulate the egress of the $CO_2$ gas to the outside and the ingress of $O_2$. The exterior layer will regulate the egress of $CO_2$ and the ingress of $O_2$ through a combination of resin material and thickness (gauge) of the first outer layer.

Disposed in contact with one surface of the above-described outer layer is a second layer comprising a polyethylene homopolymer or a polyethylene copolymer. Suitable polyethylenes for the practice of this invention are exemplified by but not limited to low density polyethylene (LDPE), linear low density polythylene (LLDPE) and ethylmethylacrylate (EMA).

The second layer of the film structure serves as an adhesive layer to bind the oriented polyamide film layer of the film to the oriented polypropylene film layer of the film structure. While polyethylenes are exemplified as useful as adhesives for binding the oriented polyamide film layer to the oriented polypropylene film layer other polymers which would function as an adhesive could also be used. Another polymer which could also function as an adhesive is exemplified by, but not limited to, polyurethane.

Disposed in contact with said second layer is a third layer comprising oriented polypropylene. The third layer of the film structure provides moisture barrier properties to the total film structure.

Disposed in contact with the third layer of the film structure is a fourth sealant layer. The sealant layer comprises a polyethylene copolymer or a polyethylene copolymer blend wherein the polyethylene copolymer is exemplified by but not limited to ethylene vinyl acetate copolymer.

In a preferred embodiment of the present invention the first outer layer is adhered directly to the second layer and the second layer is adhered directly to the third layer and the third layer is adhered directly to the fourth sealant layer.

The present invention recognizes that the $CO_2$ and the $O_2$ permeability rate are mainly regulated by the selection of the polymer for the outer layer. The $CO_2$ permeability rate and the $O_2$ permeability rate may be adjusted by selecting polyamides having different thickness (gauge). The $CO_2$ permeability rate and the $O_2$ permeability rate may also be adjusted by blending different polyamides of different thickness or blending the same polyamide but with different thicknesses. Adjustment of the $CO_2$ permeability rate is desirable because different cheeses have different $CO_2$ permeabilities and $O_2$ permeabilities requirements.

The $CO_2$ permeability rates are determined by the following procedure:

> "Carbon Dioxide Gas Transmission Rate ($CO_2GTR$): Carbon dioxide gas permeability of film was measured by using an infrared sensor and recorder which is available under the trademark Permatran C-IV by Mocon Testing of Minneapolis, Minn., U.S.A. Each tubular film is cut open to form a flattened sheet. A single thickness of each film sheet is clamped between upper and lower halves of a diffusion cell having dimensions defining a 50 $cm^2$ test area. Carbon dioxide gas (100%) is placed into the upper halve of the diffusion cell. A nitrogen carrier gas, which is free of carbon dioxide, is flushed into the bottom halve of the diffusion cell. This cell is then connected to an infrared sensor and pump creating a closed loop for circulation of the trapped nitrogen carrier gas. The infrared sensor monitors increases in connection of $CO_2$ as carbon dioxide diffuses through the test film into the closed loop of nitrogen gas, and presents a voltage trace on a strip chart recorder. This trace represents the amount of carbon dioxide diffusing. The carbon dioxide gas transmission rate is derived from the slope of the voltage trace; the instrument having been calibrated by recording voltage changes which correspond to measured amounts of $CO_2$ injected into the instrument."

The $O_2$ permeability rates are determined by the Oxygen Gas Transmission Rate ($O_2GTR$) ASTM D-3985-81.

The film structures of the present invention permit the curing, transporting and storing of a swiss-type cheese products by having a high $CO_2$ permeability rate while maintaining a low $O_2$ permeability rate and low water vapor permeability (0.3 grams/100 $in^2$/day at 100° F./90% RH). This combination of properties provides a longer shelf life (up to 6 months) for the product stored in the packages formed from the film structures of the present invention as well as an aesthetically pleasing package because of the elimination or reduction of pillowing.

Film structures of the present invention are formed by an extrusion coating process. Preferably, the first outer layer which is also in the form of a film is laminated to the third layer which is also in the form of a film via a molten polymer. The sealant layer (molten polymer) is then coated on to the surface of the third layer which is opposite the surface which is in contact with the second layer. Film structures of the present invention may also be formed by an adhesive lamination process wherein the adhesive is exemplified by polyurethane.

Film structures of the present invention may also be affixed to a second substrate wherein the substrate may be another polymeric film structure or a non-polymeric structure such as foil or paper. These structures which may be formed into packages may also be used for the storing and transporting of respiring products such as cheeses.

As is acknowledged by those skilled in the art, polymers may be modified by blending two or more polymers together and it is contemplated the various polymers may be blended into individual layers of the present film structure. It is also contemplated that an additional layer or layers wherein said layer or layers may independently contain one or more polymers may also be part of the film structures of the present invention. It is further contemplated that any layer of the present film structure or any additional layer to the present film structure may also contain processing aids.

DETAILED DESCRIPTION OF THE DRAWINGS

FIG. 1 illustrates a four-layer film structure of the present invention comprising a first outer layer (10), second layer (12), third layer (14) and a fourth sealant layer (16). Outer layer (10) comprises an poly (ε-caprolactam) second layer (12) comprises linear low density polyethylene; third layer (14) comprises oriented polypropylene; and fourth sealant layer (16) comprises ethylene vinyl acetate copolymer.

Figure 2:
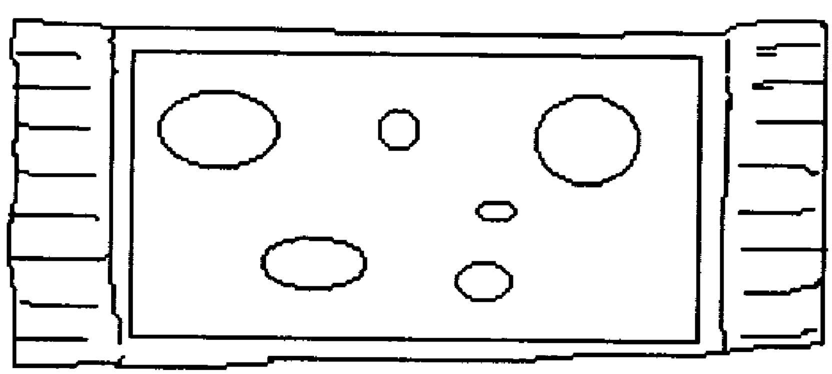
FIG. 2 depicts a swiss-type cheese encased in a package made from the film structure of FIG. 1.

FIG. 2 illustrates a swiss-type cheese encased in a package of the present invention which is made from the film structure illustrated in FIG. 1.

What we claim is:

1. A multilayer respiring cheese packaging laminate comprising a first outer layer having a thickness of from about 40 gauge to about 80 gauge comprising an oriented polyamide; a second layer comprising an adhesive; a third layer comprising an oriented polypropylene and a fourth sealant layer comprising a polyethylene copolymer, wherein said first outer layer is adhered directly to said second layer and said second layer is adhered directly to said third layer and said third layer is adhered directly to said fourth layer.

2. The multilayer respiring cheese packaging laminate according to claim 1 wherein the adhesive is polyurethane.

3. The multilayer respiring cheese packaging laminate according to claim 1 wherein the oriented polyamide is a blend of two or more oriented polyamides.

4. The multilayer respiring cheese packaging laminate according to claim 1 wherein the oriented polyamide is oriented poly (hexamethylene adipamide).

5. The multilayer respiring cheese packaging laminate according to claim 1 wherein the first outer layer has a thickness of from about 48 gauge to about 60 gauge.

6. The multilayer respiring cheese packaging laminate according to claim 1 wherein the polyethylene copolymer of the fourth sealant layer is ethylene vinyl acetate copolymer.

7. The multilayer respiring cheese packaging laminate according to claim 1 wherein the respiring cheese is a swiss-type cheese.

8. The multilayer respiring cheese packaging laminate according to claim 1 wherein the polyamide is biaxially oriented.

9. The multilayer respiring cheese packaging laminate according to claim 1 wherein the polypropylene is biaxially oriented.

10. The multilayer respiring cheese packaging laminate according to claim 1 wherein the laminate has an $O_2$ permeability rate from about 2.5 $cm^3$ per 100 $in^2$/24 hours at room temperature and 1 atmosphere to about 5 $cm^3$ per 100 $in^2$/24 hours at room temperature and 1 atmosphere.

11. The multilayer respiring cheese packaging laminate according to claim 1 wherein the laminate has a $CO_2$ permeability rate from about 10 $cm^3$ per 100 $in^2$/24 hrs. at room temperature and 1 atmosphere to about 20 $cm^3$ per 100 $in^2$/24 hrs. at room temperature at 1 atmosphere.

12. A package made from the laminate of claim 1.

13. The multilayer respiring cheese packaging laminate according to claim 1 wherein the adhesive is polyethylene.

14. The multilayer respiring cheese packaging laminate according to claim 13 wherein the polyethylene is low density polyethylene.

15. The multilayer respiring cheese packaging laminate according to claim 1 wherein the oriented polyamide is oriented poly (z,900 -caprolactam).

16. The multilayer respiring cheese packaging laminate according to claim 15 wherein the oriented poly (z,900 -caprolactam) has a thickness of 60 gauge.

17. The multilayer respiring cheese packaging laminate according to claim 15 wherein the oriented poly (z,900 -caprolactam) has a thickness of 60 gauge.

18. A multilayer respiring cheese packaging laminate having a thickness of from about 2.5 mils to about 3.5 mils comprising a first outer layer having a thickness from about 48 gauge to about 60 gauge comprising oriented poly (z,900 -caprolactam); a second layer comprising low density polyethylene, a third layer comprising oriented polypropylene; and a fourth sealant layer comprising ethylene vinyl acetate copolymer and wherein said first outer layer is adhered directly to said second layer and said second layer is adhered directly to said third layer and said third layer is adhered directly to said fourth layer and wherein said laminate has an $CO_2$ permeability rate from about 10 $cm^3$ per 100 $in^2$/24 hours at room temperature and 1 atmosphere to about 20 $cm^3$ per 100 $in^2$/24 hours at room temperature and 1 atmosphere and an $O_2$ permeability rate from about 2.5 $cm^3$ per 100 $in^2$/24 hours at room temperature and 1 atmosphere to about 5 $cm^3$ per 100 $in^2$/24 hours at room temperature and 1 atmosphere.

19. A package made from the laminate of claim 18.

* * * * *

UNITED STATES PATENT AND TRADEMARK OFFICE

CERTIFICATE OF CORRECTION

PATENT NO. : 7,008,677 B2 
APPLICATION NO. : 10/668427 
DATED : March 07, 2006 
INVENTOR(S) : Jay D. Hodson and Chad M. Perre It is certified that error appears in the above-identified patent and that said Letters Patent is hereby corrected as shown below:

column 8, line 6: change "z,900" to read -- € -- column 8, line 8: change "z,900" to read -- € -- column 8, line 11: change "z,900" to read -- € -- column 8, line 16: change "z,900" to read -- € --

Signed and Sealed this

Nineteenth Day of September, 2006

JON W. DUDAS

*Director of the United States Patent and Trademark Office*